(12) United States Patent
Kleinpenning (10) Patent No.: US 9,917,525 B1
(45) Date of Patent: Mar. 13, 2018

(54) SMPS WITH SYNCHRONOUS RECTIFICATION HAVING DEADTIME RESPONSIVE TO PEAK VOLTAGE

(71) Applicant: NXP B.V., Eindhoven (NL)

(72) Inventor: Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/678,508

(22) Filed: Aug. 16, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0025* (2013.01)

(58) Field of Classification Search
CPC ................................................ H02M 3/33592
USPC ................................ 363/21.06, 21.14, 89, 97
See application file for complete search history.

(56) References Cited

U.S. PATENT DOCUMENTS

| | | | | |
|---|---|---|---|---|
| 6,343,026 B1* | 1/2002 | Perry | ................... | H02M 3/285 323/272 |
| 8,873,254 B2* | 10/2014 | Morris | ................. | H02M 3/335 363/21.14 |
| 2009/0268494 A1* | 10/2009 | Hu | .......................... | H02M 1/08 363/89 |
| 2012/0020123 A1* | 1/2012 | Hsu | ......................... | H02M 1/32 363/21.14 |
| 2014/0098579 A1* | 4/2014 | Kleinpenning | ... | H02M 3/33523 363/21.17 |
| 2015/0249398 A1* | 9/2015 | Halberstadt | ....... | H02M 3/33592 363/21.14 |
| 2017/0288440 A1* | 10/2017 | Ye | .......................... | H02J 7/022 |
| 2017/0317602 A1* | 11/2017 | Kleinpenning | ......... | H02M 1/08 |

* cited by examiner

*Primary Examiner* — Jeffrey Sterrett
(74) *Attorney, Agent, or Firm* — Rajeev Madnawat (57) ABSTRACT

A power supply having a primary side and a secondary side is disclosed. The power supply includes a main transformer having a first side and a second side. The first side is coupled to the primary side and the second side coupled to the secondary side. The power supply further includes a primary switch coupled to the first side and a synchronous rectification switch coupled to the second side. A controller is included for driving the primary switch and the synchronous rectification switch in several operation modes including the operation in continuous conduction mode. The controller is configured to determine and set a time between turning-off of the synchronous rectification switch and turning-on of the primary switch based on sampling of the peak voltage at the drain of the synchronous rectification switch and selecting the time that corresponds with the lowest peak voltage on the drain of the synchronous rectification switch.

14 Claims, 6 Drawing Sheets

SMPS WITH SYNCHRONOUS RECTIFICATION HAVING DEADTIME RESPONSIVE TO PEAK VOLTAGE

BACKGROUND

For switch mode power supply (SMPS) converters the size and efficiency are important due to the ever shrinking size of devices. A small converter with a high output power needs a high efficiency to keep the component temperature and casing temperature low. Improvement in efficiency can be achieved by applying synchronous rectification (SR) in the AC to DC output stage of the SMPS converter. The ideal efficiency improvement that can be achieved by adding a SR with respect to rectification by diodes is the diode voltage divided by the output voltage.

The SMPS with SR converter typically includes two switches, a primary switch and a secondary switch. The switches should not conduct at the same time and for operation in "continuous conduction mode" the "make-before-break" technique of switching the two switches is employed to prevent large reverse current and large voltage peak that degrades the efficiency. The "make-before-break" technique is a configuration in which the new connection path is established after the previous contacts are opened. In other words, the "off" times of the two switches overlap for a time being during each switching cycle. The overlap period may be referred to as "dead time."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a power supply having a primary side and a secondary side is disclosed. The power supply includes a main transformer having a first side and a second side. The first side is coupled to the primary side and the second side coupled to the secondary side. The power supply further includes a primary switch coupled to the first side and a synchronous rectification switch coupled to the second side. A controller is included for driving the primary switch and the synchronous rectification switch. The controller is configured to operate in several operation modes including the operation in continuous conduction mode. In continuous conduction mode the controller determines and sets a time between turning-off of the synchronous rectification switch and turning-on of the primary switch based on a sampling of peak voltage of drain of the synchronous rectification switch.

In some embodiments, each sample in the sampling of the peak voltage on drain of the synchronous rectification switch corresponds to a time between turning-off of the synchronous rectification switch and turning-on of the primary switch with a control that selects the time that corresponds to the sample where the peak voltage on the drain of the synchronous rectification switch is lowest. In some embodiments the secondary side include the controller. However, in some other embodiments, the primary side may include the controller.

In some embodiments, a signal transformer having a primary side and a secondary side is included and coupled to the primary switch on the primary side and to the synchronous rectification switch on the secondary side. The controller includes a peak detector coupled to the synchronous rectification switch to capture peak voltage at a terminal of the synchronous rectification switch.

The controller includes a sample & hold circuit coupled to the peak detector, a toggle flip-flop coupled to the sample & hold circuit, an up-down counter coupled to the toggle flip-flop and a dead time selector coupled to the up-down counter. The primary side of the main transformer is coupled to an input supply port and the secondary side of the main transformer is coupled to an output port. In some examples, the communication between the primary side and secondary side occurs via a signal transformer.

The peak detector includes a voltage divider circuit or a subtractor circuit and the sample & hold circuit includes a circuit to compare the sampled voltage of the previous cycle with the sampled voltage of the actual cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

In synchronous rectification (SR) as used in switch mode power supply (SMPS), typically a fixed dead time is employed between turning-off of the secondary switch and turning-on of the primary switch when operating in continuous conduction mode (CCM). The fixed dead time is set long enough to cover differences in discharging time of the gate of the secondary switch and the charging time of the gate of the primary switch. The dead time is also set to keep a safety margin, under variable operating conditions and component characteristics so that there is always an overlap of "off" states of a primary and a secondary switch. The longer than needed dead time degrades the efficiency because it increases the duration of rectification via the body diode of the secondary switch.

Embodiments described herein apply an optimal dead time in real time to increase efficiency. The dead time may be continuously adjusted for each switching cycle.

Figure 1:
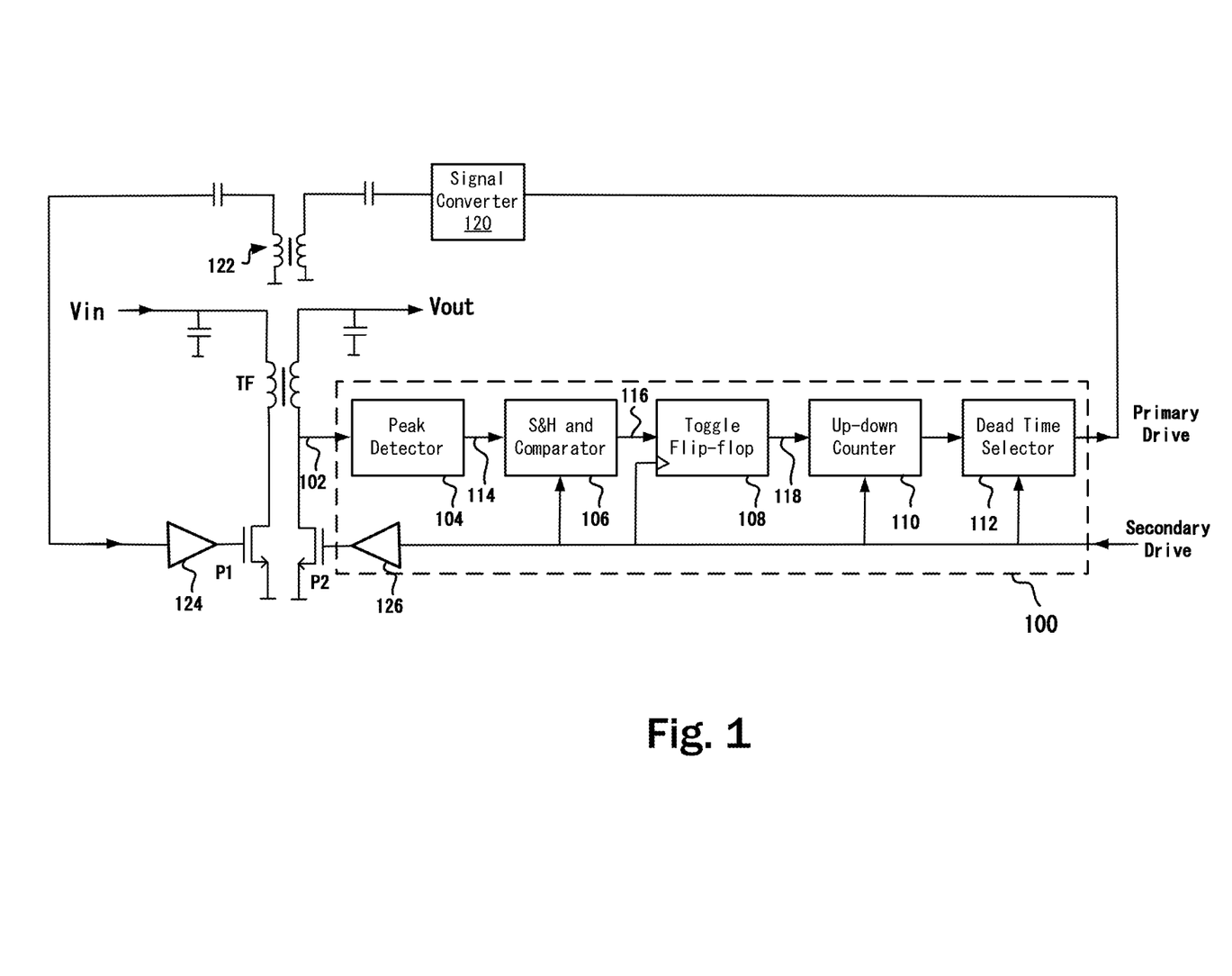
FIG. 1 shows a circuit diagram for applying an optimal dead time in accordance with one or more embodiments.

FIG. 1 illustrates a circuit 100 for setting an optimal dead time for the SR in a SMPS converter operating in CCM. The SMPS may include an input port Vin, an output port Vout, a main transformer TF, a primary switch P1 and a secondary switch P2. The improved SR in a SMPS includes the circuit 100 that monitors the drain of the secondary switch to determine drain to source peak voltage and turn on P1 and turn off P2 with an optimal dead time. The circuit 100 continuously monitors P2, hence each change in operating condition (such as input voltage Vin, output voltage Vout and output current) may lead to a different optimal dead time, thus providing optimum efficiency. The main transformer TF provides voltage step down and isolation between the primary side and the secondary side of the SMPS. As shown, the primary switch P1 is located on the primary side of the main transformer TF and the secondary switch P2 is located on the secondary side of the main transformer TF.

The control circuit 100 may include a peak detector 104, a sample & hold and comparator 106, a toggle flip-flop 108, an up-down counter 110 and a dead time selector 112. The dead time may be selected based on the count output of the up-down counter 110 and in one example, the dead time may vary from 0 ns to 500 ns. In some embodiments, the dead time selector 112 generates a pulse to control the switching of P1 by delaying the switching control signal for switching-on of P1 by a selected dead time based on the count output of the up-down counter 110. In these embodiments, a switching signal generator (not shown) may provide a switching signal to drive the gate of P2 and based on the off signal for P2, the driver circuit 100 generates a drive signal for turning-on P1.

The up-down counter 110 counts each switching cycle. In case the VpkSR goes down the counter continues to count in the direction given by the signal 118. In case the VpkSR goes up the counter changes the count direction steered by the toggled signal 118. Based on the count and a preselected step resolution, the dead time selector 112 selects a dead time. For example, if the preselected resolution is 10 ns and the count is 20, 200 ns dead time is selected. If in the next cycle the count goes down, the dead time also goes down to 190 ns. In some examples, the preselected resolution may be in the range of 5 ns to 20 ns, preferably approximately 10 ns. An optimal resolution can be determined through tests. For example, a too small value of the preselected resolution will require more steps to reach an optimal dead time. On the contrary a larger preselected resolution will require less steps to reach a setting for the dead time but in between those long steps, the real optimal dead time maybe stepped over and thus reducing efficiency. In some embodiments, the initial dead time is set at a high value, for example 300 ns and then the dead time is adjusted continuously based on the count output from the up-down counter 110. It may be noted that VpkSR peak voltage may be continuously or routinely changing with changing load or changing input voltage.

The input voltage VpkSR 102 is inputted to the peak detector 104 that captures the peak input voltage at the drain of P2. The output signal VpkDet 114 is the DC representation of the input peak voltage VpkSR and inputted to the sample & hold and comparator 106 to compare the previous input voltage VpkDet with the actual input voltage VpkDet. The sample & hold and comparator 106 output the signal VpkUpDown 116. The toggle flip-flop 108 monitors the VpkUpDown signal and the output toggles if VpkUpDown is high in the actual switching cycle. The up-down counter 110 counts up or down depending on the level of VpkUpDown with 1 count step per switching cycle and generates a count that is used to generate a switching control signal for P1 based on the switching control signal for P2.

Drive signals to turn P1 and P2 on/off may go through gate drivers 124, 126. Since the drive signals may be low voltage/power signals, the gate drivers 124, 126 may supply necessary amount of current to drive P1, P2. Further, from the output of the dead time selector 112, the drive signal for driving P1 may go through a signal converter 120 and a signal transformer 122. The signal transformer 122 provides electrical isolation between the primary side (P1 side) and the secondary side (P2 side) and enables two way data communication. The signal converter 120 may encode the signal pulses from the dead time selector 112 into a corresponding signal that induces a voltage at the output of the signal transformer 122. A capacitor between the signal converter 120 and the signal transformer 122 may be used to remove DC component from the signal that is inputted to the signal transformer 122. It may be noted that the signal transformer 122 provides a two way communication. That is, if a signal is needed to be sent from the primary side (P1 side) to the secondary side (P2 side), the signal may also go through the signal transformer 122. The signal converter 120 may use Manchester encoding to encode the signal. A signal converter (not shown) may be used on the primary side to enable two way data communication. Further, a decoder may be employed on the primary side to decode the switching signal output from the signal transformer 122.

A typical SMPS includes a control chip on the primary side to drive the primary side switch and a control chip on the secondary side to drive the secondary switch. As stated above, these two control chips drive the two switches and can use a fixed preset dead time for SMPS operation in continuous conduction mode. Among other things, the embodiment described herein renders unnecessary a need for having a primary side switch driver because both switches can be controlled from the secondary side driver chip, which includes the circuit 100. Moreover, a use of the signal transformer 122 enables two way data communication between the primary and the secondary sides. The signal transformer 122 is relatively smaller than the main transformer TF. The size of TF generally depends on the power ratings and input voltage of the SMPS but the power ratings may not influence the size of the signal transformer 122 because the signal transformer 122 is used for low voltage (e.g., 3V) communication. In one example, the circuit 100 may be fabricated in one integrated circuit.

The secondary drive signal is generated by a secondary control circuit or gate driver circuit (not shown). The secondary drive signal is inputted to P2 preferably through the gate driver 126. The secondary drive signal is also inputted to the internal blocks of the circuit 100 to provide synchronization.

Figure 2:
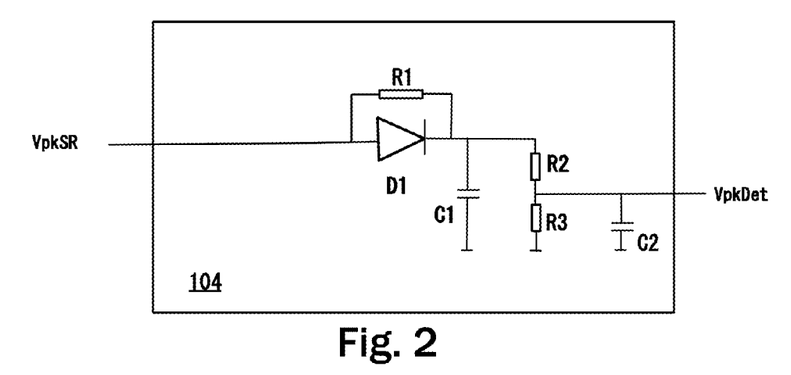
FIG. 2 shows a schematic of a peak detector in accordance with one or more embodiments.

FIG. 2 shows the schematic of the peak detector 104. The peak detector 104 captures the peak voltage at the drain of P2 and at least temporarily stores the peak voltage. The peak detector 104 includes diode D1, resistor R1 connected in parallel to D1. Capacitors C1, C2 and resistors R2 connected in parallel to C1 and resistor R3 connected in parallel to C2.

C1 is used for temporarily holding the value of the peak voltage until the next cycle and if the peak voltage is higher in the next cycle, C1 is charged to the new peak voltage. R2 and R3 are connected in series and are used for obtaining a lower voltage from the input voltage VpkSR. For example, VpkSR may be approximately 100V and using appropriate values for R2 and R3, in one example, approximately 3V (VpkDet) is outputted. In some embodiments, instead of the voltage divider formed by R2 and R3 may be replaced by a voltage subtractor. VpkDet output of the peak detector 104 may depend on the switching voltage range of P1 in the example in FIG. 1 and the values of R2 and R3 may be adjusted accordingly D1 may be a fast diode to capture a voltage peak as narrow as in the range of 5 to 15 ns.

Figure 3:
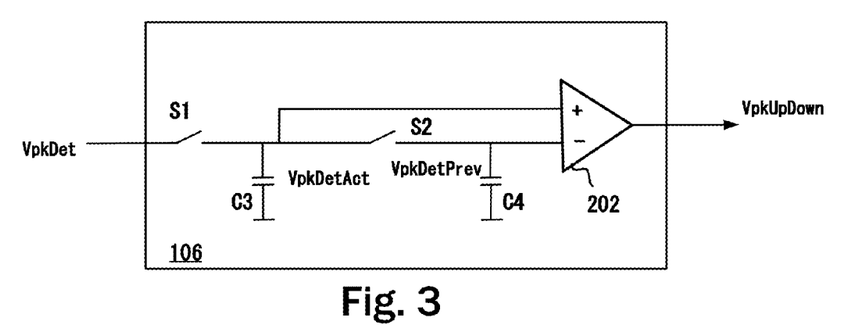
FIG. 3 shows a schematic of a sample & hold and comparator circuit in accordance with one or more embodiments.

FIG. 3 shows a sample & hold and comparator 106 that is configured to indicate if the peak voltage at its input has increased or decreased compared to the previous cycle. The sample & hold and comparator 106 may include switches S1, S2 and capacitors C3, C4. S1 and S2 are switched such that C2 holds VpkDetAct (actual VpkDet) and C4 holds VpkDet from the previous cycle (VpkDetPrev). A comparator 202 is included to output VpkUpDown pulse based on the comparison of VpkDetAct and VpkDetPrev.

Figure 4:
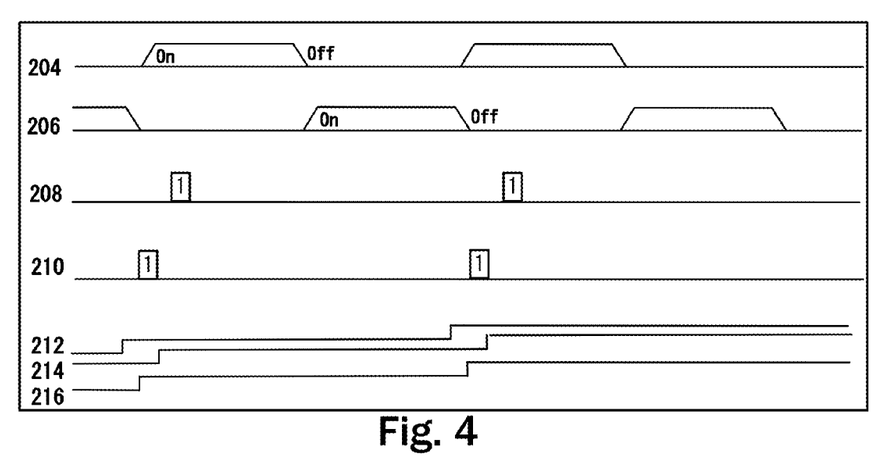
FIG. 4 shows a pulse diagram of the sample & hold and comparator circuit in accordance with one or more embodiments.

FIG. 4 shows a switching state diagram of the sample & hold and comparator 106. The diagram includes P1 on/off state 204, P2 on/off state 206, S1 conducting period 208, S2 conducting period 210, VpkDet 212, VpkDetAct 214 and VpkDetPrev 216. X-axis represents time and Y-axis represents voltage. However, the diagram is not drawn to scale. When P1 is on, P2 is off. After P2 has been turned off, P1 turns on and S2 conducts for a brief period of time and transfers the peak voltage of the previous cycle to the second capacitor C4. Then switch S1 conducts and stores the peak voltage of the actual cycle on the first capacitor C3.

Figure 5A:
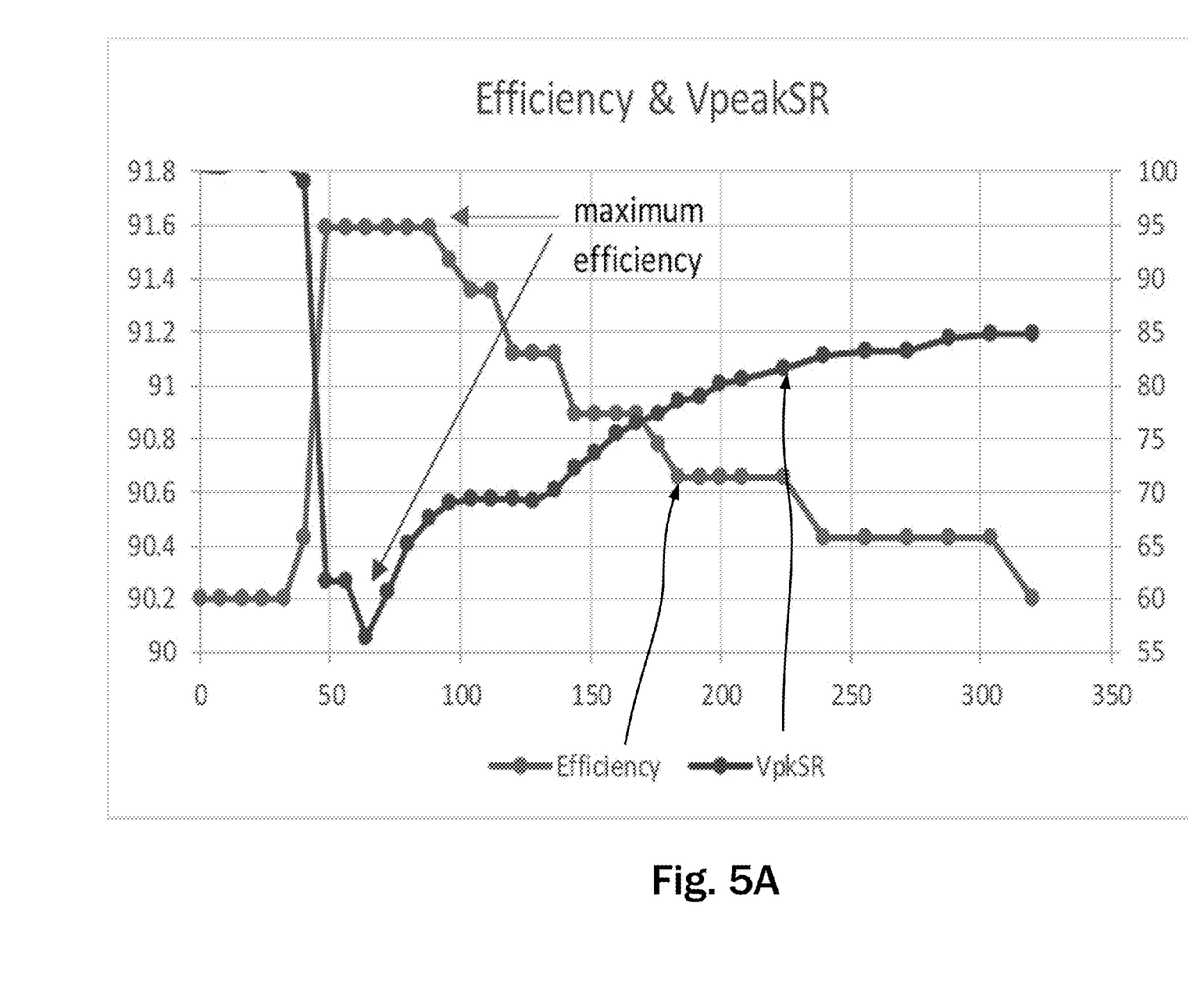
FIGS. 5A-5B show an efficiency curve with peak voltages at various dead time settings.
Figure 5B:
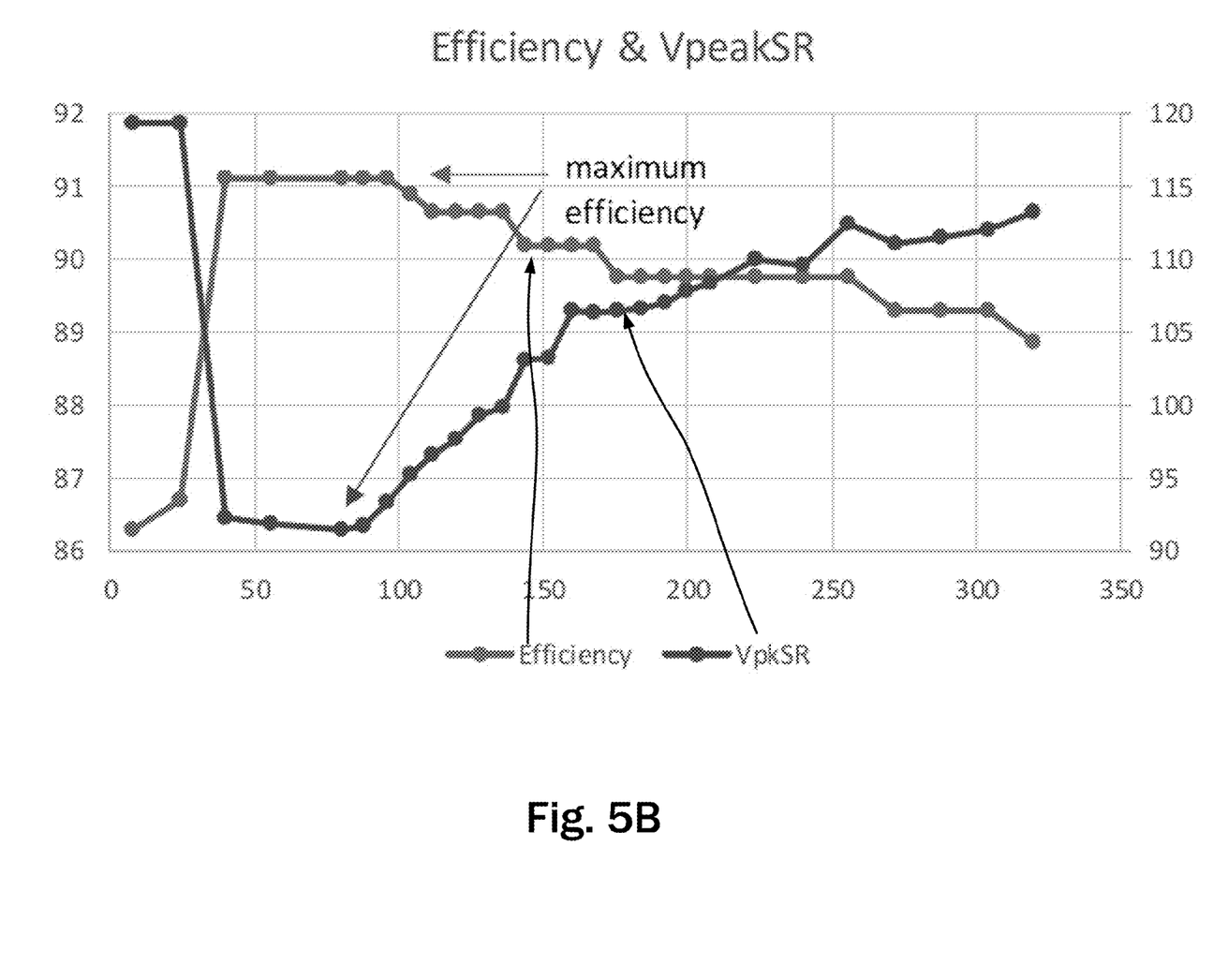

FIG. 5A illustrates a graph of efficiency at various values of VpkSR at Vin=100 Vdc, Vout=11.9V, Iout=3.00 Å. Horizontal axis is dead time in a range from 0 ns to 320 ns. Left vertical axis is the efficiency. Right vertical axis is the peak voltage of the secondary switch (P2). As shown, the maximum efficiency occurs at or around the valley of the peak voltage. Efficiency drop by too early or too late turn off of the secondary switch (P2) is approximately 1.5%. FIG. 5B shows efficiency graph when Vin is 200 Vdc. Efficiency drop by too early turn off of the secondary switch (P2) is approximately 2% and by too late turn off approximately 5%.

Figure 6:
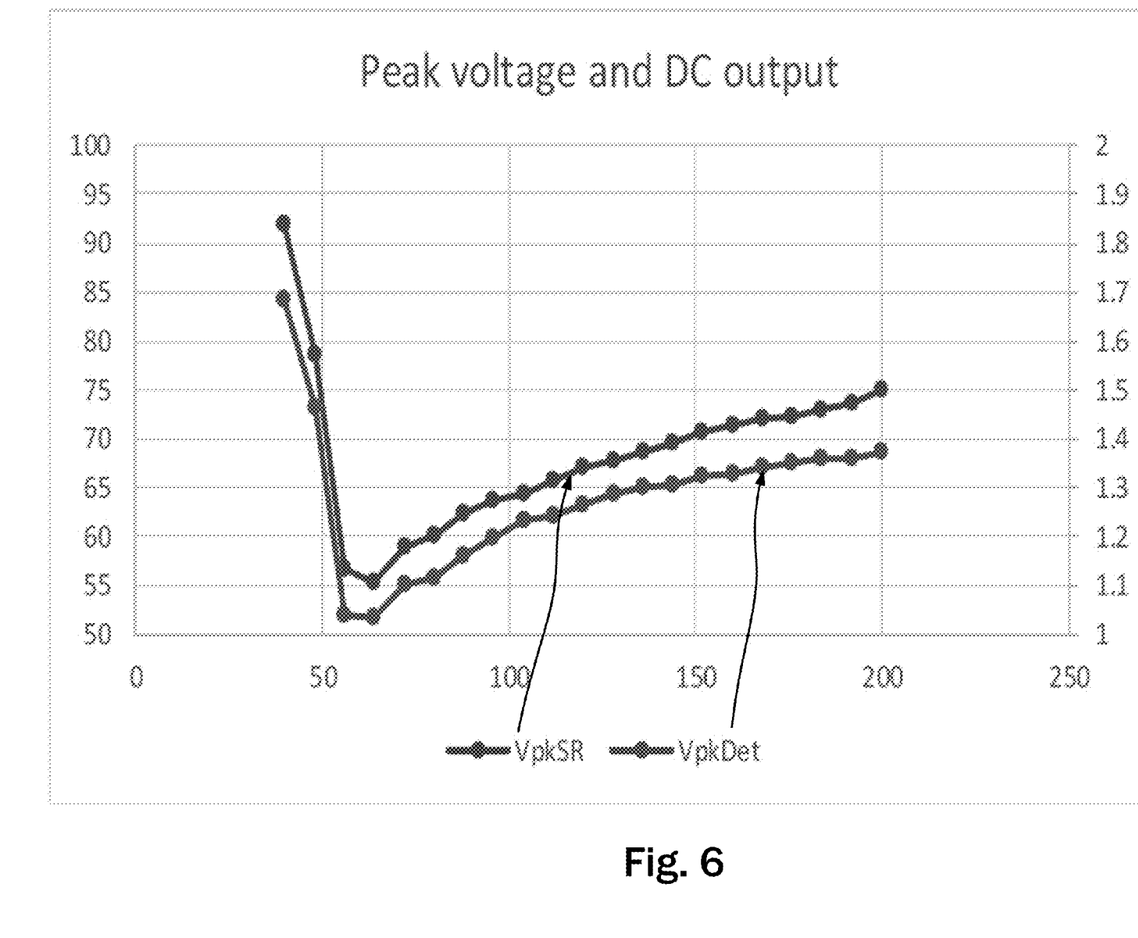
FIG. 6 shows a relationship of input peak voltage, DC output voltage of the peak detector at various dead time settings.
Figure 7:
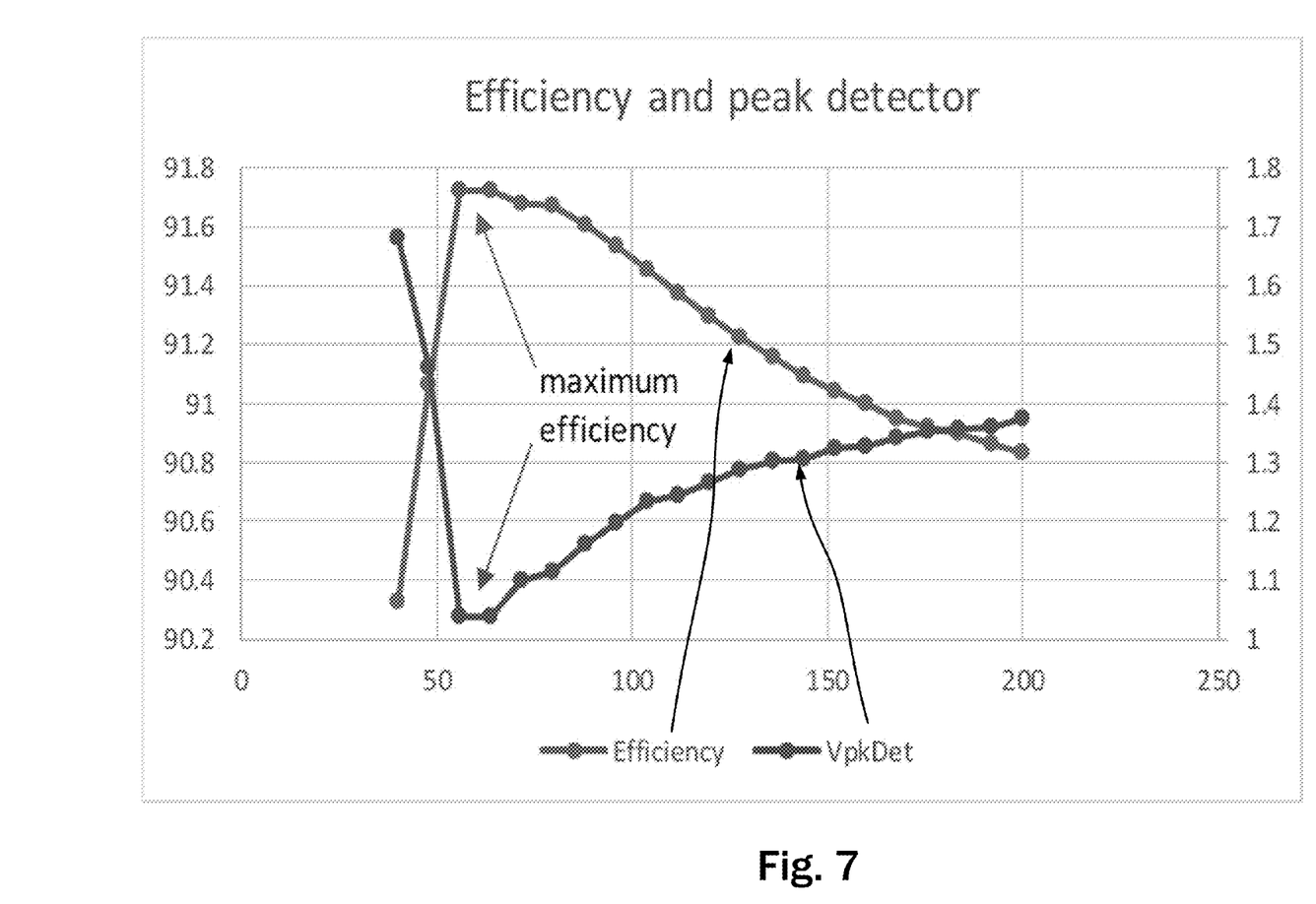
FIG. 7 shows a curve illustrating efficiency and DC output voltage of the peak detector as a function of dead time.

FIG. 6 illustrates VpkSR (left Y-Axis) and VpkDet (right Y-Axis) of the peak detector 104 as a function of dead time (X-Axis). FIG. 7 shows Efficiency and DC output (VpkDet) voltage as function of dead time. As shown, the maximum efficiency occurs at the lowest output of the peak detector 104.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A power supply having a primary side and a secondary side, the power supply comprising:
   a main transformer having a first side and a second side, wherein the first side is coupled to the primary side and the second side coupled to the secondary side;
   a primary switch coupled to the first side;
   a synchronous rectification switch coupled to the second side; and
   a controller for driving the primary switch and the synchronous rectification switch in a continuous conduction mode, wherein the controller is configured to determine and set a time between turning-off of the synchronous rectification switch and turning-on of the primary switch based on a sampling of peak voltage at drain of the synchronous rectification switch.

2. The power supply of claim 1, wherein each sample in the sampling of the peak voltage at the drain of the synchronous rectification switch corresponds to a time between turning-off of the synchronous rectification switch and turning-on of the primary switch with a control that selects the time that corresponds to the sample where the peak voltage at the drain of the synchronous rectification switch is lowest.

3. The power supply of claim 2, wherein the communication between the primary side and secondary side occurs via a signal transformer.

4. The power supply of claim 1, wherein the controller includes a peak detector coupled to the synchronous rectification switch to capture peak voltage at a terminal of the synchronous rectification switch.

5. The power supply of claim 4, wherein the peak detector includes a voltage divider circuit or a voltage subtractor circuit.

6. The power supply of claim 4, wherein the controller further includes a sample & hold circuit coupled to the peak detector.

7. The power supply of claim 6, wherein the sample & hold circuit includes a circuit to compare a previous voltage input to the sample & hold circuit with a actual voltage input.

8. The power supply of claim 6, wherein the controller further includes a toggle flip-flop coupled to the sample & hold circuit.

9. The power supply of claim 8, wherein the controller further includes an up-down counter coupled to the toggle flip-flop.

10. The power supply of claim 9, wherein the controller further includes a dead time selector coupled to the up-down counter.

11. The power supply of claim 1, wherein the first side of the main transformer is coupled to an input supply port and the second side of the main transformer is coupled to an output port.

12. The power supply of claim 1, wherein the secondary side includes the controller.

13. The power supply of claim 1, wherein the primary side includes the controller.

14. The power supply of claim 1, further including a signal transformer having a first side and a second side and coupled to the primary switch on the first side and to the synchronous rectification switch on the second side.

* * * * *